March 10, 1970  G. H. LEONARD  3,499,610
EXTENSIBLE TUBE ARRANGEMENTS
Filed Aug. 29, 1967  7 Sheets-Sheet 1

INVENTOR
GEORGE HAMLIN LEONARD
by Mason, Kolehmainen,
Rathburn and Wyss
ATTORNEYS March 10, 1970 G. H. LEONARD 3,499,610
EXTENSIBLE TUBE ARRANGEMENTS
Filed Aug. 29, 1967 7 Sheets-Sheet 5

INVENTOR
GEORGE HAMLIN LEONARD by Mason, Kolehmainen,
Rathburn and Wyss
ATTORNEYS.

United States Patent Office

3,499,610
Patented Mar. 10, 1970

3,499,610
EXTENSIBLE TUBE ARRANGEMENTS
George Hamlin Leonard, Darien, Conn., assignor to Consolidated Controls Corporation, Bethel, Conn., a corporation of New Mexico
Filed Aug. 29, 1967, Ser. No. 664,185
Int. Cl. B65h *75/00;* E04h *12/18*
U.S. Cl. 242—54                                                                 6 Claims

ABSTRACT OF THE DISCLOSURE

An extensible boom structure is provided wherein a flat strip, which is initially drawn so that it forms a cylindrical tube of predetermined diameter when unrestrained, is stored on a storage reel in flat form and may be extended therefrom by suitable drive means to form a rigid, torque resistant cylindrical tube. The edges of the strip are provided with interlocking wedge shaped bearing surfaces which limit the diameter to which the tube can be formed to a diameter somewhat larger than said predetermined diameter. The bearing surfaces are thus continuously held in tightly wedged engagement so that the extended boom resists rotational and bending forces exerted thereon. Facilities are provided for extending and retracting the boom without tearing the interlocking edges of the strip and while providing the correct interleaving action of the opposed edges as the tube is extended. Facilities are also provided for extending and retracting the boom by means of a very low power device such as a small reversible electric motor.

---

The present invention relates to extensible tube arrangements and, more particularly, to extensible tube arrangements which may be employed in rectractable antenna systems and certain types of satellite or space craft systems wherein gravity gradient stabilization is provided by extending a relatively long gravity gradient boom from the satellite which always points toward the earth and stabilizes the satellite.

Certain arrangements heretofore proposed have employed an extensible tube arrangement in which a flexible tape may be stored as a relatively flat strip on a storage reel or drum and may be extended in the form of a cylindrical tube to provide a mast type antenna, or gravity gradient boom for an orbiting satellite. In certain of these arrangements, the tape has merely been pre-stressed so that it will form a cylinder as it is released from the storage reel. Such simple tube structures are extremely susceptible to torsional forces and are also susceptible to large amounts of column bending when the boom is several hundred feet in length. This is because the open seam of the tube permits a large amount of rotation or bending per unit length along the tube, with the result that a boom several hundred feet in length may bend many feet at the end thereof.

Certain other arrangements have provided a multisection collapsible rod in which separate strips are interconnected when the rod is extended and are separately stored as flat strips when the rod is collapsed. However, these arrangements require substantial additional storage space and difficulties are encountered in synchronizing the drive mechanisms of the three strips to provide the correct interlocking with the edges thereof. Also, these structures when extended are again susceptible to torsional forces and column bending, particularly when booms of several hundred feet in length are used, due to the slight tolerance or clearance which is afforded between the notches of the individual strip sections of the boom.

Still other arrangements have employed a single strip having square notches on the opposed edges thereof, which interlock when the strip is extended and forms a cylindrical tube. Such arrangements have required special heat treatment so that the edges alternately extend inside or outside of the cylinder as the tube is formed. Furthermore, the slight clearance which is required for the square cornered tabs to mesh provides sufficient play in the attaching edges so that the extended tube is again very susceptible to rotational forces and to column bending. This is because even a very small amount of play at each notch is multiplied many hundreds of times in a boom several hundred feet in length with the result that it is not possible to extend the tube and predict accurately where the end of the tube will be with respect to the device from which the tube is projected. Also, with arrangements having square tabs, the extended tube is not perfectly round, since alternate ones of the tabs stick out beyond the periphery of the tube. Furthermore, when such strips are stored on a reel in flat form, the tab edge portions resist straightening out because of discontinuities at the sharp corners and tend to crack or tear at the sharp edges. In addition, when a strip with square tabs is wound flat many layers thick on the reel, the tabs tend to interlock between the different layers and are torn off or twisted as the strip is unreeled.

It is, therefore, an object of the present invention, to provide a new and improved extensible tube arrangement which eliminates one or more of the disadvantages of the prior art arrangements.

It is another object of the present invention to provide a new and improved extensible tube arrangement in which a cylindrical tube may be formed from a tape which is stored in flat form on a reel, the tube being resistant to torsional forces or column bending when extended as a boom of substantial length.

It is a further object of the present invention to provide a new and improved extensible tube arrangement wherein inclined bearing surfaces are provided on opposed edges of the tube which are held in wedging engagement when the tube is extended so that the extended tube resists torsional forces and column bending.

It is a still further object of the present invention to provide a new and improved extensible tube arrangement wherein the strip from which the tube is formed can be stored in completely flat form on a storage reel, so that a strip many hundreds of feet in length may be stored in a small space and may be readily extended to form a rigid torsion resistant boom.

It is another object of the present invention to provide a new and improved extensible tube arrangement wherein wedging surfaces are provided on opposite edges of the tube which are held in tightly wedged interlocking engagement by virtue of the tendency of the tube to form a cylinder of smaller diameter than is permitted by the wedged interlocking surfaces.

It is still another object of the present invention to provide an extensible tube arrangement wherein the interlocked edges of the extended tube engage each other over a large area to provide substantial friction for vibration damping when the tube is extended.

It is a further object of the present invention to provide a new and improved extensible tube arrangement which may be stored as a flat strip and which may be extended to form a cylindrical tube or retracted without causing tearing at the interlocking edges of the strip.

It is a still further object of the present invention to provide a new and improved apparatus for extending and retracting an extensible tube and storing the same in flat form wherein facilities are provided for separating the interlocking edges of the tube as it is retracted without tearing said interlocking edges.

It is another object of the present invention to provide a new and improved extensible tube arrangement in which a strip, which has been pre-stressed form a cylinder when unrestrained, is stored on a reel in flat form and facilities are provided for insuring that the opposed edges of the strip are properly interleaved as the stored flat strip is formed into a cylindrical tube.

It is a still further object of the present invention to provide a new and improved apparatus for extending and retracting a flexible strip from a storage reel on which the strip is stored in flat form, said strip being pre-stressed to form a cylindrical tube when unrestrained, wherein a very low powered device may be used to extend and retract the strip.

Briefly, the extensible tube structure of the present invention comprises a relatively wide, flat strip of thin metal which has been initially drawn so that it will form an elongated cylindrical tube of predetermined diameter when unrestrained. This strip is stored in flat form on a storage reel from which it may be unreeled and allowed to form a cylindrical tube. The opposed edges of the tube are provided with alternately spaced long and short tongue portions which define steeply sloped bearing surfaces which engage and prevent further overlapping of the edges at a diameter which is greater than the diameter to which the tube is initially drawn. Since the tube has a tendency to return to the small diameter to which it was initially drawn, the wedge shaped bearing surfaces on opposite edges of the tube are continuously held in tightly interlocked engagement. As a result, the extended tube is highly resistant to rotational and bending loads even though it may be several hundred feet in length. The long and short tongues are provided with gently rounded corners and no portions of the scalloped edges of the strip are perpendicular to the longitudinal axes of the tube so that tearing or cracking at the interlocking edges is positively avoided. Also, an arrangement is provided for interleaving the opposed edges in such manner that the long tongue portions on each edge are tucked into the interior of the tube beneath the opposed short tongue so that a double overlap is provided and a large area of contact is provided between the opposed bearing surfaces which results in increased vibration damping of the extended boom.

The invention, both as to its organization and method of operation, together with further objects and advantages thereof, will best be understood by reference to the following specification taken in connection with the accompanying drawings in which.

Referring now to the drawings and more particularly to the embodiment of FIGS. 1 to 25, inclusive, the extensible tube structure of the present invention is therein illustrated as comprising a housing, indicated generally at 50, within which the extensible boom or tube is stored as a flat tape, and a hollow cylindrical member 52 connected to the housing 50 within which the tape is formed into a rigid tube and from which the tape may be extended as a cylindrical tube for distances up to several hundred feet.

The housing 50 comprises a pair of side plates 54 and 56 which are spaced in parallel relation by means of posts 58, 60 and 62 and are secured together by means of the screws 64, 66 and 68. A flexible cover member 70 is provided which extends around the periphery of the side plates 54 and 56 and is secured to a closure member 72 by means of the screws 74 so that a totally enclosed structure is provided for the stored tape, the closure member 72 being secured to the side plates 54 and 56 by means of the screws 76.

Within the housing 50 there is provided a storage reel 80 which is secured to a shaft 82 by means of the set screw 81, the shaft 82 being rotatably mounted in bearings 84 and 86 provided in the side plates 56 and 54, respectively. The tape 88, which may be extended from the housing 50 and member 52 in the form of a rigid cylindrical tube, is stored on the periphery of the storage reel 80 in the form of a perfectly flat tape so that a large amount of tape may be stored in a compact form within the housing 50. The inner end of the tape 88 is secured to the reel 80 by means of the set screws 83. Preferably the tape 88 is formed of beryllium copper having a thickness of 0.003 to 0.005 inches so that a boom structure having a length of several hundred feet may be stored on the reel 80.

A drive cylinder 90 is secured to an elongated cylindrical drive hub 91 by means of a set screw 93. The hub 93 is rotatably mounted in the bearings 92 and 94 provided in the side plates 54 and 56. The drive cylinder 90 carries a series of sprocket teeth 96 which project above the surface of the drive cylinder 90 to engage corresponding apertures 98 in the tape 88.

Intermediate the drive cylinder 90 and the supply reel 80 there is provided an idler cylinder 100 which is rotatably mounted in the bearings 102 and 104 provided in the side plates 54 and 56. The idler cylinder 100 is positioned relatively close to the periphery of the drive cylinder 90 so that the tape 88 is held tightly against the surface of the drive cylinder 90. A groove 106 is provided in the surface of the idler cylinder 100 to accommodate the upper ends of the sprocket teeth 96. A similar idler wheel 108 is also provided above the drive cylinder 90 and closely spaced to the periphery thereof, the idler cylinder 108 being rotatably mounted in the bearings 110 and 112 provided in the side plates 54 and 56. The cylinder 108 is also provided with a groove 114 to accommodate the ends of the sprocket teeth 96.

In order to drive the cylinder 90, a gear 116 is secured to the end of the drive cylinder 90 by means of the screw 118, the gear 116 meshing with an idler gear 120 which is secured-to a shaft 122 by means of the set screw 124. The shaft 122 is rotatably mounted in the bearings 126 and 128 provided in the side plates 54 and 56. The idler gear 120 meshes with a drive gear 130 which is rotatably mounted on the shaft 82. The drive gear is interconnected with the shaft 82 by means of a spiral power spring 132, the inner end of which is secured to a hub portion 134 of the gear 130. The outer end of the spiral spring 132 is secured to a pin 136 which is positioned in the supply reel 80 and extends into a recess 138 in the end of the reel 80 which accommodates the spiral spring 132.

In the embodiment of FIGS. 1 to 25, inclusive, the extendable boom structure is manually extended and retracted from the housing 50. Accordingly, a drive wheel 140 is secured to the shaft 82 externally of the housing 50, the wheel 140 being provided with an eccentrically mounted pin 142 by means of which the wheel 140 may be manually rotated so as to extend and retract the tape 88 to and from the housing 50.

In order to limit the number of revolutions through which the reel 80 may be rotated so that the tape 88 will not be damaged by exerting excessive tensile force thereon when the end of the tape is reached, a series of limit washers 144 is provided on the shaft 82 between the reel 80 and the side plate 54. Each of the washers 144 is provided with a projecting lug portion 146, the lug portion 146 of the outermost washer being positioned in an aperture 148 in the front plate 54 and the lug portion of the rearmost washer being positioned in an aperture 150 in the reel 80. Accordingly, after a number of revolutions the lost motion washers 144 will all be interconnected so that the reel 80 is interlocked with the side plate 54. Rotation of the shaft 82 in the opposite direction a number of revolutions will again bring the lost motion washers 144 into engagement on the other side of the lugs thereof and limit travel of the reel 80 accordingly.

As described heretofore, the tape 88 is preferably made of very thin material, such as beryllium copper, and this tape is heat treated to a high degree so that it is quite brittle. Accordingly, extreme care must be taken to prevent the tape 88 from crinkling, particularly in the area between the drive cylinder 90 and the supply reel 80. To this end, the spiral spring 132 maintains a substantially constant tension of several pounds load on the tape between the drive cylinder 90 and the supply reel 80. Also, the idler 100 is positioned so that the web of the tape takes a reverse bend between the drive cylinder 90 and the supply reel 80. Furthermore, by providing a spiral spring 132, as distinguished from a conventional coil spring, almost constant tension is maintained on the web of tape between the drive cylinder 90 and the supply reel 80, since the spiral power spring 132 provides nearly constant torque over a number of turns of rotation. If a conventional coil spring were used, the spring tension would increase at a much greater rate and would increase the load on the tape as it is being payed out, a condition which is undesirable in the described extensible boom structure. In this connection, it is pointed out that the drive wheel 90 may be driven directly, instead of the storage reel 80, and may be motor driven instead of manually operated. Furthermore, the ratios of the gears 130, 120 and 116 may be altered to accommodate different types of structures. For example, when a long boom is needed and a large amount of tape is stored on the reel 80 there will be a large change in tape velocity during the extension operation and the gear ratios can be chosen to minimize rotation of the power spring 132. Also, the gear ratio may be chosen to help or hinder the extension or retraction of the boom when the reel 80 or drive wheel 90 is driven by a motor. For example, if equal torque is desired for both extension and retraction of the boom, so that a minimum power reversible motor may be used to drive the boom the gear ratio is chosen to counteract the boom's natural tendency to pay out so that the torques required for extension and retraction of the boom will be the same. Thus, if the spring 132 is wound up as the boom is extended, which would mean a smaller gear on the storage reel 80, then the spring 132 will oppose the tendency of the tape to extend in paying out and will aid the driving motor when the boom is being retracted.

Figures 1, 5, 6:
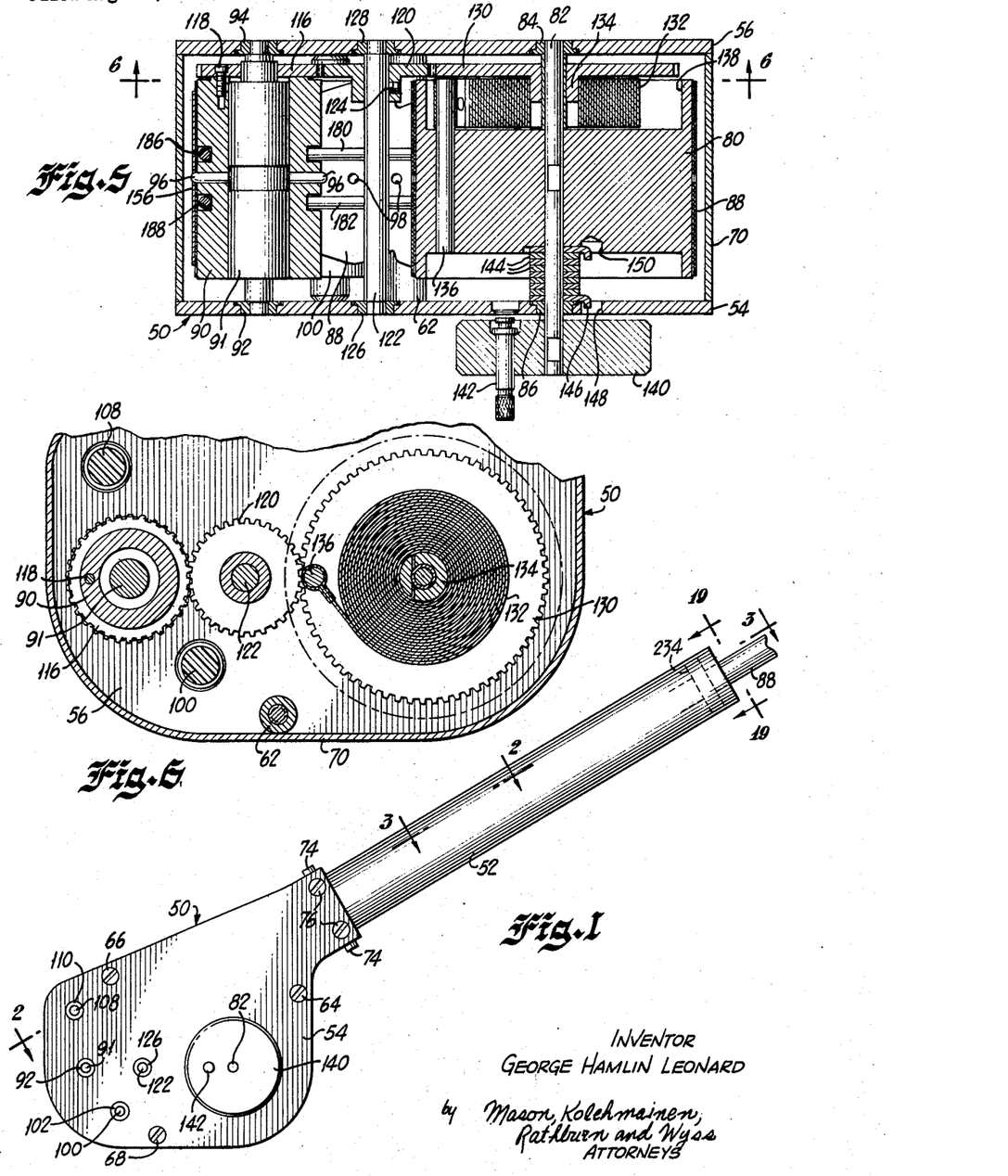
FIG. 1 is a side elevational view of an extensible tube structure embodying the features of the present invention.
FIG. 5 is a sectional view taken along lines 5—5 of FIG. 4.
FIG. 6 is a sectional view taken along lines 6—6 of FIG. 5.
Figure 2:
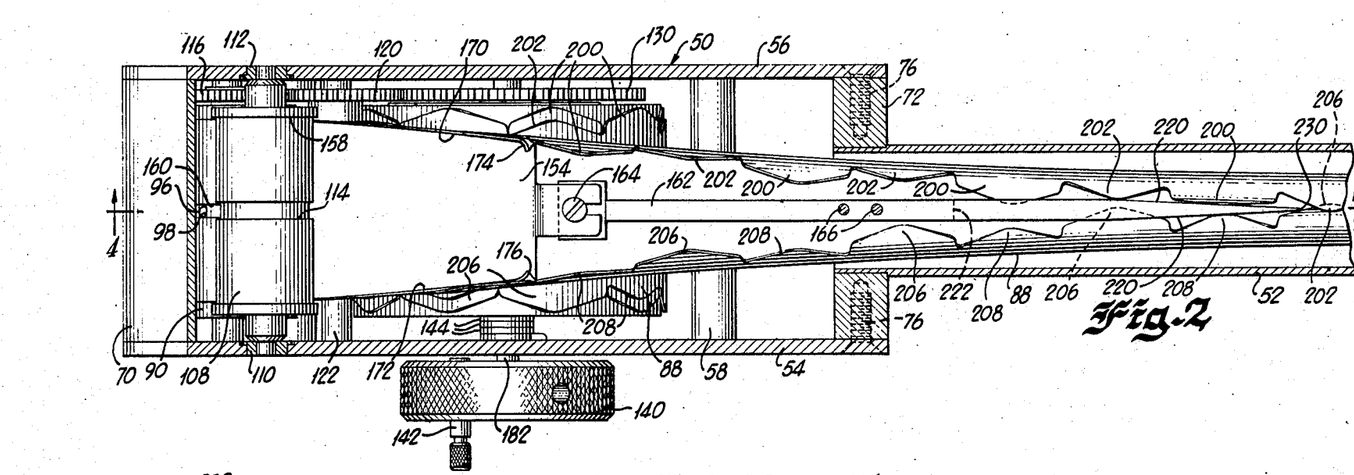
FIG. 2 is a sectional view taken along lines 2—2 of FIG. 1 but on a somewhat enlarged scale.
Figures 3, 11:
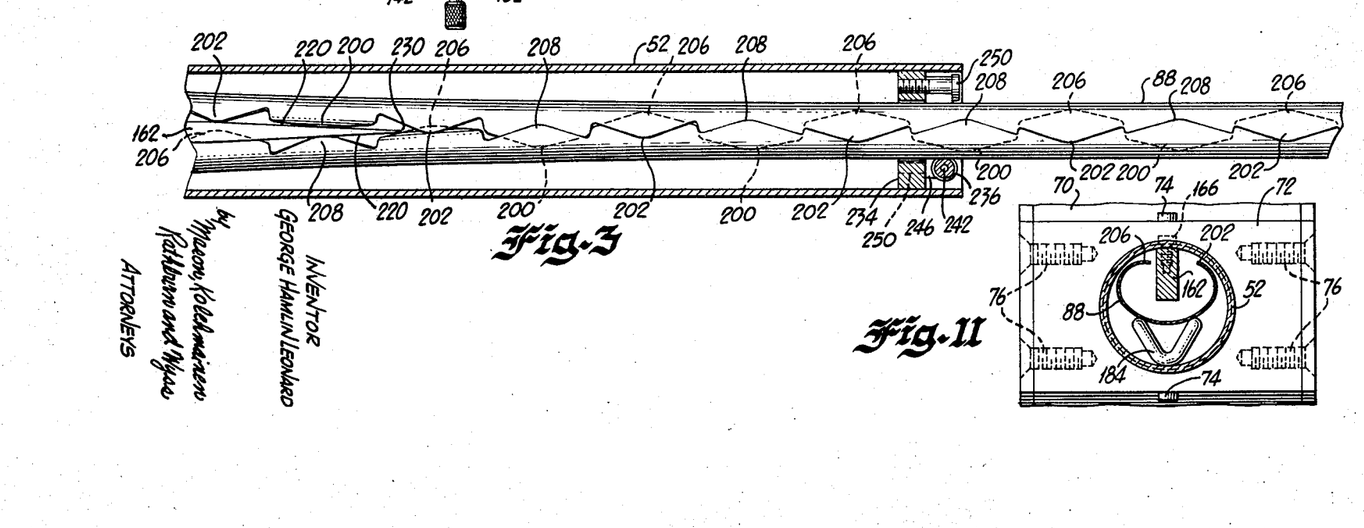
FIG. 3 is a sectional view taken along lines 3—3 of FIG. 1 but on a somewhat enlarged scale.
FIG. 11 is a sectional view taken along lines 11—11 of FIG. 4.
Figures 4, 7, 8, 9, 10:
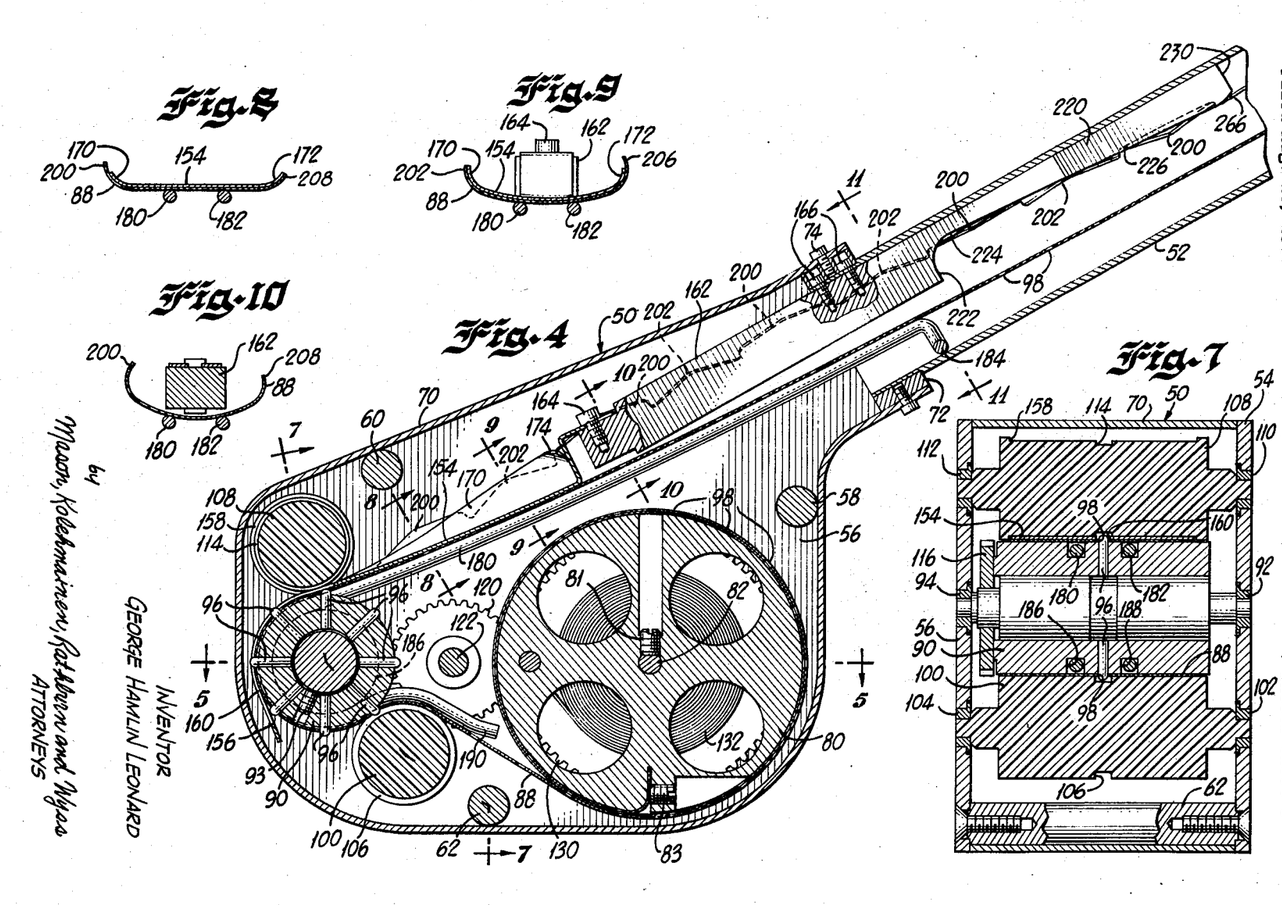
FIG. 4 is a sectional view taken along lines 4—4 of FIG. 2 but on a somewhat enlarged scale.
FIG. 7 is a sectional view taken along lines 7—7 of FIG. 4.
FIG. 8 is a sectional view taken along lines 8—8 of FIG. 4.
FIG. 9 is a sectional view taken along lines 9—9 of FIG. 4.
FIG. 10 is a sectional view taken along lines 10—10 of FIG. 4.
Figure 12:
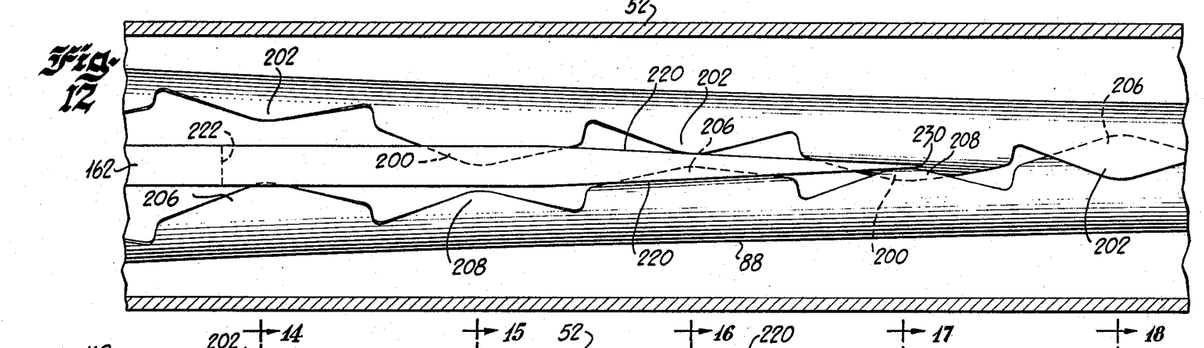
FIG. 12 is a fragmentary plan view similar to FIG. 2 but taken on a somewhat larger scale.
Figure 13:
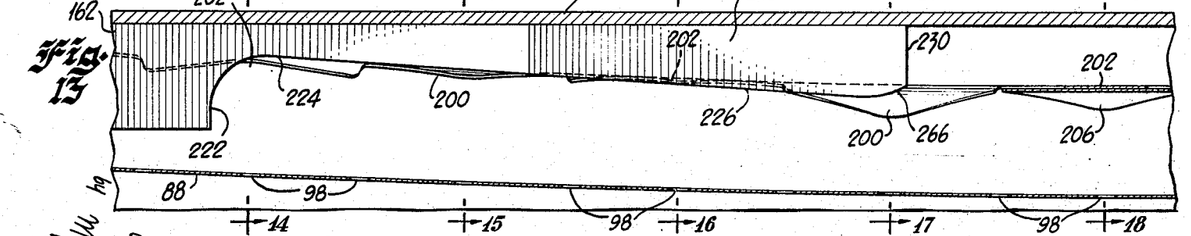
FIG. 13 is a fragmentary sectional view taken along lines 13—13 of FIG. 4 but shown on an enlarged scale similar to FIG. 12.
Figure 14:
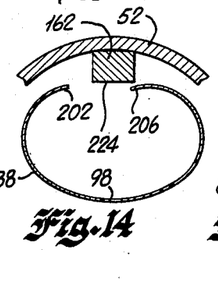
FIG. 14 is a sectional view taken along lines 14—14 of FIG. 13.
Figures 15, 16, 17:
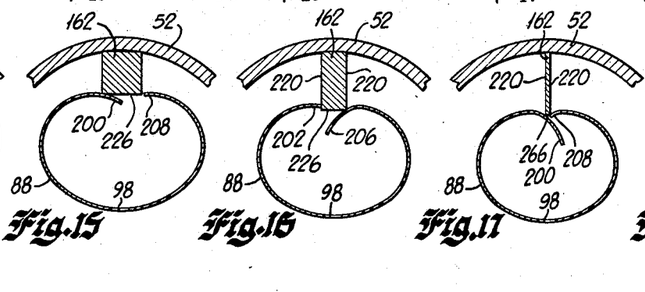
FIG. 15 is a sectional view taken along lines 15—15 of FIG. 13.
FIG. 16 is a sectional view taken along lines 16—16 of FIG. 13.
FIG. 17 is a sectional view taken along lines 17—17 of FIG. 13.
Figure 18:
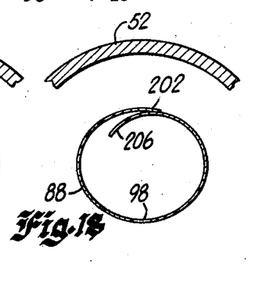
FIG. 18 is a sectional view taken along lines 18—18 of FIG. 13.
Figure 19:
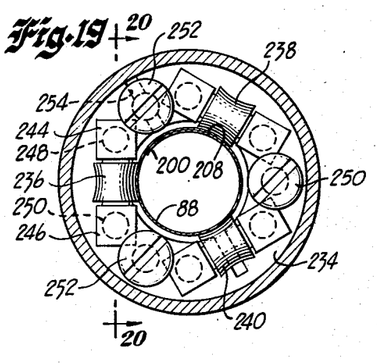
FIG. 19 is a sectional view taken along lines 19—19 of FIG. 1 but shown on a somewhat enlarged scale.
Figure 20:
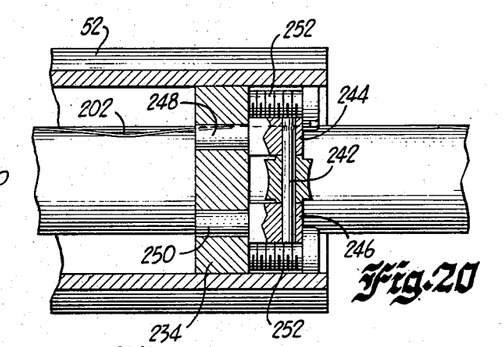
FIG. 20 is a sectional view taken along lines 20—20 of FIG. 19.

In order further to insure that the tape is maintained completely flat as it extends around the drive cylinder 90 and in order to facilitate the shaping of the tape into a cylindrical tube, a guide member indicated generally at 154 is provided which extends partially around the drive cylinder 90 and terminates in an end portion 156. The guide member 154 is arranged to fit within a groove 158 formed in the periphery of the idler cylinder 108 and is provided with a clearance slot 160 for the sprocket teeth 96. The upper end of the guide member 154 is secured to a guide bar 162 by means of the screws 164, the solid guide bar 162 being itself secured to the inner surface of the member 52 by means of the screws 166 which also act to secure the member 52 to the closure 72. The sides 170 and 172 of the guide member 154, between the idler cylinder 108 and the guide member 162, are flared upwardly as best illustrated in FIGS. 4, 8 and 9 and are tapered inwardly toward the guide member 162, as best illustrated in FIG. 2, to facilitate the formation of the desired cylindrical tube from the flat tape which comes off the drive cylinder 90. The upper corners 174 and 176 of the side walls 170 and 172 are also curved inwardly, as best illustrated in FIG. 2, to facilitate flattening of the tape as it is reeled back onto the supply reel 80. Also, a second guide means is provided in the form of a pair of guide wires 180 and 182, these wires being positioned on the other side of the tape 88 from the guide member 154 and being connected together at the upper end thereof by means of a V-shaped end portion 184 (FIG. 11) which rests on the inner surface of the member 52. The guide wires 180 and 182 are positioned in grooves 186 and 188 in the periphery of the drive cylinder 90, are reversely bent to extend around the idler cylinder 100, and terminate in end portions 190 (FIG. 4) which are in close proximity to the supply reel 80. The guide wires 180 and 182 thus function to hold the tape against the idler cylinder 100 and also support the tape as it is being formed into a tube after it leaves the drive cylinder 90.

Considering now the manner in which the tape 88 is formed into a rigid torsion resistant tube in accordance with the present invention, the tape 88 is initially formed from a blank ribbon approximately two inches wide, and having straight sides. This blank ribbon is heat treated and is then drawn by pulling it through a suitable annular orifice so that the tape tends to form an elongated cylinder of predetermined diameter the sides of which have a substantial overlap. In accordance with an important feature of the present invention, the diameter to which the ribbon is initially drawn is smaller than the actual diameter to which the tape 88 is permitted to assume when it comes off of the drive cylinder 90.

After the tape has been heat treated and drawn so that it tends to form a cylinder, each edge of the tape is then shaped to provide a series of alternately spaced long and short tongues. More particularly, referring to FIG. 21, long tongues 200 are spaced alternately with short tongues 202 along one edge 204 of the tape 88 and long tongues 206 are spaced alternately with short tongues 208 along the other edge 210 of the tape. Furthermore, the long tongues 200 along the edge 204 are positioned opposite the short tongues 208 on the opposite edge 210 and the long tongues 206 on the edge 210 are positioned opposite the short tongues 202 on the edge 204. It will be noted that while the tongues 200 and 206 are somewhat longer than the tongues 202 and 208, both sets of tongues have a relatively high ratio of width along the length of the tape as compared to the length thereof projecting transversely of the tape edge.

Figure 21:
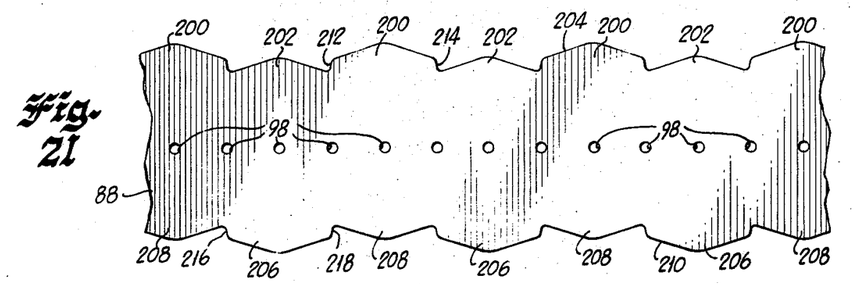
FIG. 21 is a plan view of the extensible tape employed in the arrangement of FIG. 1, but shown with the tape stretched flat.

In accordance with an important feature of the invention the relatively long tongues 200 on the edge 204 are offset laterally from the tongues 202 to provide inclined bearing surfaces 212 and 214. Also, the tongues 206 on the edge 210 are offset from the tongues 208 to provide inclined bearing surfaces 216 and 218. Since the long tongues 200 are staggered on opposite edges of the tape, the bearing surfaces 212 and 214 will engage with the corresponding bearing surfaces 216 and 218 of the long tongues 206 on the opposite side of the tape when the tape edges are meshed. These bearing surfaces are so positioned that they engage before the tape reaches the diameter to which it was originally drawn. Accordingly, the bearing surfaces are continuously urged into wedging engagement with one another due to the tendency of the tape 88 to form a smaller cylinder than is permitted by engagement of these bearing surfaces.

Figure 22:
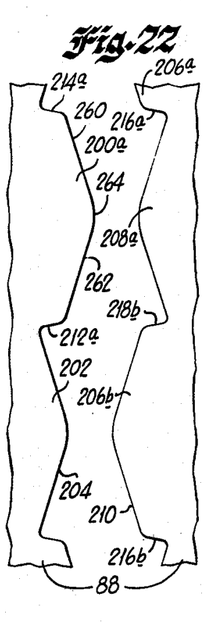
FIG. 22 is a fragmentary view of a portion of the extensible tape shown with the opposed scalloped edges thereof widely separated.
Figure 23:
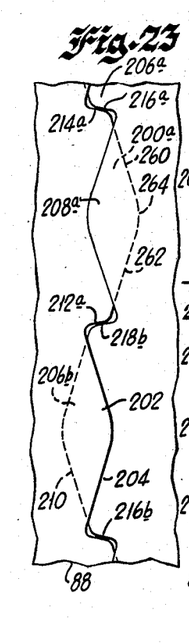
FIG. 23 is a fragmentary view similar to FIG. 22 but showing the opposed edges of the tape about to be tightly wedged in interlocking relation.
Figures 24, 25:
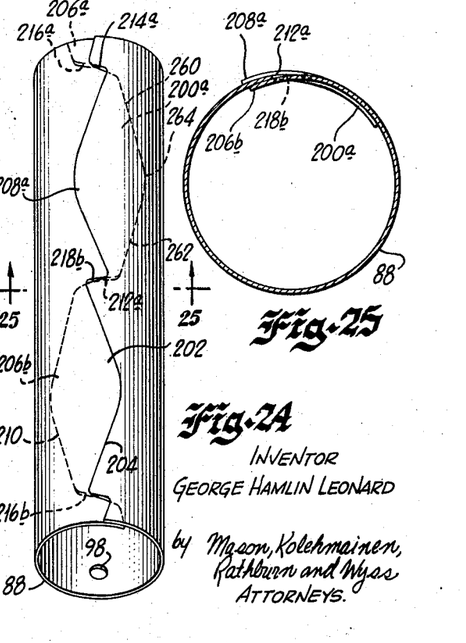
FIG. 24 is a perspective view of a section of the extensible tape provided in the structure of FIG. 1.
FIG. 25 is a sectional view taken along lines 25-25 of FIG. 24.
Figures 26, 27, 28:
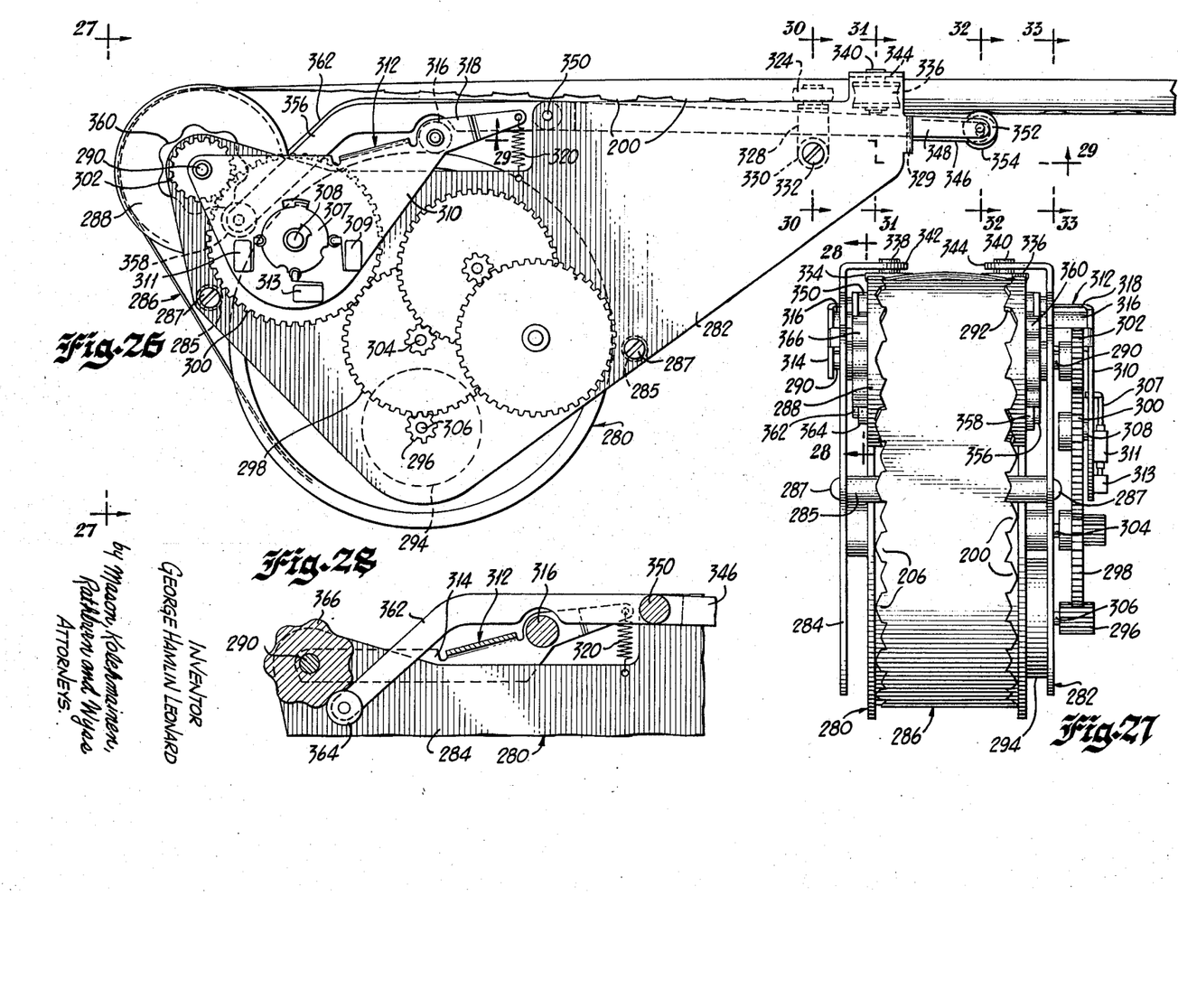
FIG. 26 is a side elevational view of an alternative extensible tube structure according to the present invention.
FIG. 27 is a sectional view taken along lines 27—27 of FIG. 26.
FIG. 28 is a sectional view taken along lines 28—28 of FIG. 27.

This wedging action is perhaps most clearly shown in FIGS. 22 and 23. Referring to FIG. 22, a long tongue 200a on the edge 204 is shown in opposition to a short tongue 208a on the other edge 210. The bearing surface 214a of the tongue 200a is thus opposed to the bearing surface 216a of the large tongue 206a on the edge 210. Also, the bearing surface 212a of the tongue 200a is in opposed relation to the bearing surface 218b of the large tongue 206b on the edge 210. As the tape 88 is permitted to form into a cylinder (FIG. 23), the bearing surfaces 214a and 212a are moved into wedging engagement with the bearing surfaces 216a and 218b, on the opposite edge of the tape.

The edges of the blank tape may be cut to form the above-described long and short tongues, after the heat treating and drawing operation, by any suitable means. For example, the tape may be flattened by any suitable guide arrangement and a continuous rotary die, of the type used to perforate stamps, may be used to cut the edges of the tape to form the above-described tongues and bearing surfaces. Such an arrangement will provide the necessary dimensioning of the engaging bearing surfaces to a high degree of accuracy. In the alternative, a hitch feed punch press may be used to form the edge of the tape 88. While such a punch press arrangement is not as accurate as the rotary die arrangement, it may in some instances be more desirable, since, as stated heretofore, the tape 88 is made of extremely thin material.

It will be noted that the bearing surfaces at the edges of the tape do not engage along lines perpendicular to the longitudinal axis of the tube, but instead engage along lines which are inclined slightly with respect to such a perpendicular. Also, these bearing surfaces are inclined toward the center of the long tongue so that the bearing surfaces, such as the surfaces 212a and 218b, for example, engage and wedge together to prevent further closure of the tube to a smaller diameter. This engagement and wedging action takes place before the bottom corners of the long and short tongues are engaged so that a force is continuously exerted on these bearing surfaces to hold them together. As a result, a tightly wedged interlocking arrangement is provided for each length of the tape so that the tube, when fully formed, is highly resistant to twisting or torsional forces which may be exerted thereon. This is because the wedge-shaped bearing surfaces are almost perpendicular to the longitudinal axis of the tube and yet are held in continuous engagement by the shrinking forces developed in the tape which try to form a smaller cylinder than is permitted by engagement of the bearing surfaces. As a result, the completely formed tube is almost as rigid for torsional movements as if the bearing surfaces, such as the surface 212a and 218b were spot welded together. In this connection it is important to realize that if the bearing surfaces, such as the surfaces 212a and 218b, were exactly perpendicular to the longitudinal axis of the tube, then no wedging action would occur, and each section of the tube could be slightly twisted before the perpendicular edges would engage. This would mean that an extended boom many hundreds of feet in length would be extremely susceptible to torsional forces, since the slight clearance produced in each section of the tube would be multiplied many hundreds of times at the end of the boom.

In accordance with a further important feature of the invention, each of the long tongues 200 and 206 on opposite edges of the tape, are tucked underneath the corresponding short tongue 202 and 206 on the opposite edge of the tape, by means of an arrangement to be described in more detail hereinafter. By thus providing a doubly overlapped arrangement in which the long tongues are all tucked inside the tube, the area over which the bearing surfaces engage is substantially increased. Since these bearing surfaces are held in wedging engagement by the tendency of the tape to form a smaller diameter, substantially increased friction is provided between each pair of bearing surfaces due to the large area of contact of these surfaces. This increased friction provides better vibration damping for the extended boom. Accordingly, with the arrangement of the present invention, the extended boom is both rotationally stiff and is resistant to column bending so that the boom can be projected and one can predict accurately where the end of the extended boom will be.

It will also be noted that the long and short tongues which are formed along the edges of the tape 88 are of such configuration that all of the corners are in the form of gently rounded curves and no sharp edges are present which would tend to produce stress concentration and crinkling of the tape as it is wound on and off of the reel 80. Also, when the tape 88 is stored on the reel 80 the tongues on different layers do not catch or interlock due to the high ratio of width to length of the tongues and the provision of gently rounded corners on each edge of the tape.

Considering now the arrangement provided for guiding the tape as it is extended and retracted and for tucking the long tongues into the interior of the tube as it is formed, the guide member 162 is provided with an end portion which is tapered as indicated at 220 so that the tip 230 of the guide member 162 is sharply pointed. Also, the underside of the guide member 162 is undercut at 222 to provide a recessed portion 224 which is positioned above the top edge of the tape as it unreels so as to permit the long tongue portions on each edge to extend into this recess. The bottom edge of the guide member 162 is then inclined downwardly from the recess 220 to the tip 230 of the guide member, as indicated at 226 in FIG. 13.

It will be noted that the guide wires 180 and 182 support the bottom surface of the tape 88, as it is being extended, so that the long tongue portions thereof are correctly positioned to enter the recess 224 as the tape is extended.

As the tape is extended by movement of the drive cylinder 90, the long tongues 200 and 206 first extend inwardly into the recess 224 and then as the tape continues to be extended, these long tongues are curled downwardly as they engage the downwardly inclined bottom surface 226 of the guide member 162, as is best illustrated by FIGS. 14 to 17, inclusive, taken at various points along the guide member 162. On the other hand, the short tongues 202 and 208 are not curled downwardly to any great extent, if at all, and as the tape moves beyond the end 230 of the guide member 162 the long tongues 200 and 206 on opposite edges of the tape are all tucked inside of the tube which is being formed. As the tape moves farther away from the tip 230 of the guide member 162, the forces in the tape tending to form a small diameter tube urge the bearing surfaces 212, 214 and 216, 218 into wedging engagement, as described in detail heretofore.

In order to insure that the tape has been formed into the desired cylindrical tube before it leaves the member 52, a guide arrangement is provided at the outer end of the member 52. More particularly, a roller mounting block 234 is fitted into the end of the member 52 and a series of concave rollers 236, 238 and 240 are mounted on transversely extending pins 242. The pins 242 are each supported in a pair of pivot blocks, such as the blocks 244 and 246 having stud portions 248 and 250, respectively, which fit into corresponding openings in the mounting block 234. A series of three screws 252 are threaded into the block 234, the heads of these screws engaging the top corners of the pivot blocks 244, 246 to hold the same in place. The mounting block 234 is in the form of an annular member and is provided with a split portion 254 into which one of the screws 252 extends so as to force the mounting block 234 against the inner surface of the member 52 and thus hold it in place.

The concave rollers 236, 238 and 240 are positioned so that they engage the outer surface of the cylindrical tube which the tape 88 forms as it is extended beyond the tip of the guide member 162. These rolls engage the tube at equally spaced points around the periphery thereof and are so positioned that they insure the wedging engagement of the above-described bearing surfaces as the tube passes beneath these rolls.

When the tape 88 is retracted back into the housing 50, the pointed end or tip 230 of the guide member 162 engages the overlapped edges of the tape and separates these edges so that the tape may be moved back into the housing and stored on the reel 80 in flat form. More specifically, as the tape is retracted, the end 230 engages the long tongues 200 and 206 and curls these tongues inwardly in the same manner as described heretofore in connection with the extension of the tape. It will be noted that the tongues 200 and 206 are not provided with blunt ends but instead are provided with slightly inclined edges, such as the edges 260, 262 of the tongue 200a shown in FIG. 22 which are joined together by a rounded tip portion 264. Furthermore, a similar shape is given to the short tongues 202 and 208.

This configuration of the long and short tongues facilitates the separation of the opposed edges of the tape as it is retracted into the housing. In addition, the bottom edge of the guide member 162 adjacent the tip 230 is preferably curved upwardly, as indicated at 266 in FIG. 13 to prevent tearing of the tape as the tongues engage the tip 230. More particularly, the inclined edges of the tongues, such as the inclined edges 260, 262 of the tongue 200a, first engage the curved end portion 266 of the guide member 162 so that a gentle camming action is produced which curls the ends of the tongues inwardly without tearing of the tape. It is also pointed out that the guide member 154 holds the tape in a relatively flat extended position at a point somewhat behind the recess 224 which also facilitates separation of the overlapped portions of the tape as it is retracted into the housing 50.

In addition to providing a rigid torsion, rigid resistant boom, the wedging engagement of the bearing surfaces provided by the present invention has the additional advantage that the extendable tube may be employed for space applications in which the tape is perforated in a predetermined pattern of holes to permit sunlight to strike the inside surfaces of the tape and heat up the side of the tape away from the sun to prevent a large temperature gradient across the tube. This advantage arises from the fact that the wedging engagement of the bearing surfaces on opposite edges of the tape provide a very accurate and precise matching of the tongue portions which are overlapped along the edge of the tube. Since these tongue portions are precisely aligned with respect to one another, they may include a desired hole pattern (not shown) and the holes in the overlapping tongues will be in registry so that a uniform hole pattern may be provided over the entire surface of the extendable boom.

In space applications such as the one just described, and in other situations, it may be desirable to eliminate the sprocket holes 98 provided in the tape 88 of the embodiment of FIGS. 1 to 25, inclusive, since these sprocket holes may not conform to a desired pattern of holes in the tape provided for other purposes. Also, it is in many instances desirable to drive the extensible tape by means of an electric motor, since a gravity gradient boom must in many instances be extended from an unattended space craft or satellite. In such instances, an alternative embodiment as shown in FIGS. 26 to 33 may be employed. In these figures, a storage reel indicated at 280 is monuted between a pair of side plates 282 and 284, which are held together by means of the parts 285 and screws 287. An extendable tape indicated generally at 286 is stored on the reel 280 and may be unreeled therefrom to form a rigid cylindrical tube. The tape 286 may be identical to the tape 88 as described heretofore, except for the omission of the sprocket holes 98.

In order to extend and retract the tape 286, there is provided a drive wheel 288 which is rotatably mounted between the side members 282 and 284 on the shaft 290. The periphery of the drive wheel 288 is provided with a scalloped edged recess 292, the edges of the recess 292 being shaped to conform to the configuration of the edges of the tape 286. Due to the irregular shape of the edges of the tape 286, particularly the steeply inclined edges of the bearing surfaces described heretofore, the drive wheel 288 is positively indexed with the tape and may be used to extend and retract the tape, as was the drive wheel 90 in the previously described embodiment.

The drive wheel 288 is driven by means of an electric motor 294, secured to the side member 282, through a gear train which includes the gears 296, 298, 300 and 302. The gear 302 is mounted on the shaft 290. The gear 298 is rotatably mounted on a stub shaft 304 secured to the side plate 282 and the gear 296 is mounted on the motor shaft 306. The idler gear 306 is mounted on a stub shaft 308 extending from one side plate 310 of a pivotally mounted assembly indicated generally at 312. The assembly 312 is pivoted for rotation about the axis of the shaft 290 and includes an opposite side member 314 also pivotally mounted for rotation on this axis. The assembly 312 is provided with a transversely extending roller 316 which is mounted between the extending arm portions 318 of the side members 310 and 314, the roller being urged into engagement with the surface of the tape 286 wound on the reel 280 by means of a spring 320 connected between the side plate 282 and the arm 318. Since the roller 316 bears on the outside of the tape spiral on the reel 280, it shifts the position of the assembly 312 as tape is unwound from the reel and the diameter of the tape spiral decreases. By mounting the idler gear 306 on the pivotally mounted assembly 312, the idler gear is shifted laterally as the diameter of the tape spiral changes, and advances or retards the drive wheel 288 by an amount sufficient to maintain the tape 286 between the drive wheel 288 and the reel 280 with a minimum amount of slack.

When the motor 294 is energized, the drive wheel 288 is rotated in the direction to extend the tape 286, through the gear train 296, 298, 300 and 302. As stated heretofore, due to the irregular shape of the edges of the tape 286, which fit within the edges of the recess 292 of the drive wheel 288, a positive drive connection is afforded for both extension and retraction of the tape 286. In this connection it will be understood that suitable guide wheels, such as the idler cylinders 100 and 108 in the embodiment of FIGS. 1 to 25, inclusive, may be employed to hold the tape flat against the drive wheel 288 as it is reeled and unreeled, if desired. The motor 294 may be controlled by any suitable arrangement. For example, a cam 307 may be positioned on the end of the shaft 308 and a stack of limit washers, similar to the washers 144 (FIG. 5), may be provided between the idler gear 300 and the cam 307. When the idler gear 300 has been rotated a predetermined number of revolutions the cam 307 is shifted and controls a motor forward microswitch 309, a motor reverse microswitch 311 and an end of travel switch 313, which are connected to control the driving motor 294. The switch 313 may be employed in a suitable relay holding circuit so that the boom may be either held in the extended position or the switch 311 may be used to reverse the motor and retract the boom.

Figures 29, 30, 31, 32, 33:
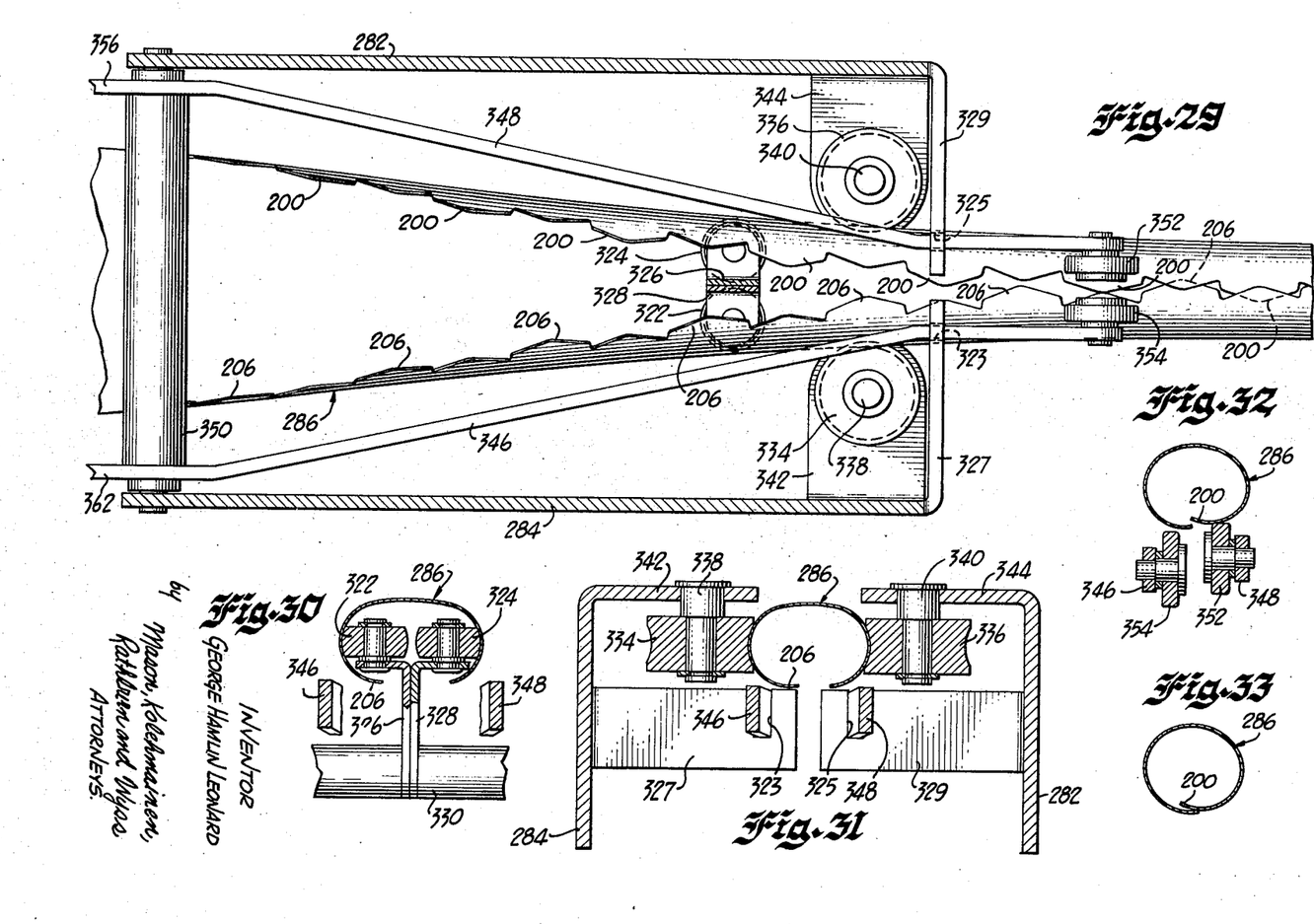
FIG. 29 is a sectional view taken along lines 29—29 of FIG. 26.
FIG. 30 is a sectional view taken along lines 30—30 of FIG. 26.
FIG. 31 is a sectional view taken along lines 31—31 of FIG. 26.
FIG. 32 is a sectional view taken along lines 32—32 of FIG. 26.
FIG. 33 is a sectional view taken along lines 33—33 of FIG. 26.

As the tape comes off of the drive wheel 288, it extends substantially horizontally and passes around a pair of convex rollers 322 and 324, as best illustrated in FIG. 30. The rollers 322 and 324 are mounted for rotation about a vertical axis on the offset ends on a pair of brackets 326 and 328 which are supported by a post 330 which extends between the side members 282 and 284 and is secured thereto by means of the screws 332. After the tape passes the rollers 322 and 324, it passes inside of a pair of concave rollers 334 and 336 which are mounted for rotation about vertical axes on the studs 338 and 340 mounted on the inturned flange portions 342 and 344 of the side members 282 and 284.

The rollers 322, 324 and 334, 336 function to guide the tape 286 as is forms into a cylindrical tube. However, it is also necessary to insure that the long tongues 200 and 206 are tucked underneath the opposite short tongues so that the tongues are properly interleaved as the tape forms the final cylindrical tube. To this end, a pair of cam operated interleaved follower arms 346 and 348 are pivotally mounted on a transverse member 350 which is secured to the side members 282 and 284. The free outer ends of the follower arms 346 and 348 are provided with rollers which are adapted alternately to engage opposite edges of the tape 286 at a time when a long tongue is positioned under the roller so as to insure that this particular long tongue portion is positioned underneath the opposite short tongue portion. More particularly, the follower arm 348 is provided with a roller 352 which is positioned to engage the long tongue 200 and the follower arm 346 is provided with a roller 354 which is adapted to engage and depress the long tongues 206. The ends of the follower arms 346 and 348 are positioned properly with respect to the tape 286 by means of the vertical slots 323 and 325 provided in the inturned flange portions 327 and 329 of the side members 284 and 282, respectively.

The follower arm 348 is provided with an offset arm portion 356 on the other side of the pivot 350 from the free end of the arm 348 and a roller 358 is mounted on the end of the offset portion 356 which is adapted to engage a cam 360 which is mounted on one end of the drive wheel 388 and rotates therewith. In a similar manner, the follower arm 346 is provided with an offset portion 362 which carries a roller 364 which engages and is controlled by a cam 366 mounted on the other end of the drive wheel 288. The follower arms 346 and 348 are held in engagement with the respective cams 366 and 360 by any suitable bias means (not shown) and the cams 360 and 366 are so positioned on the drive wheel 288 that one of the rollers 352, 354 is moved into engagement with the corresponding long tongue to depress the same and snap it past the opposed short tongue while at the same time the other roller is elevated away from the tape 286. The follower arms thus swing upwardly alternately to cause the desired interleaf of the long and short tongues on opposite edges of the tape.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. An extensible tube structure comprising a thin metallic strip prestressed to form a hollow tube of predetermined diameter when unrestrained, means defining spaced apart tongue portions along each edge of said strip, said tongue portions along one edge of strip being staggered with respect to tongue portions along the other edge of said strip and each tongue portion being positioned beneath the adjacent portions of the opposite edge of said strip when said hollow tube is formed, each of said tongue portions having a pair of steeply sloped edges which are held in wedging engagement with the edges of the opposite tongues by the shrinking forces existing in the strip and act to form a hollow tube of a diameter greater than said predetermined diameter, said pairs of steeply sloped edges being substantially parallel at said points of wedging engagement with the corresponding steeply sloped edges of alternate ones of the tongue portions on the opposite edge of said strip, whereby said hollow tube is able to resist torsional forces exerted thereon.

2. An extensible tube structure as set forth in claim 1 wherein all portions of said scalloped edges are inclined at an angle with respect to a line perpendicular to the longitudinal axis of said hollow tube.

3. An extensible tube apparatus, comprising a thin metallic strip prestressed to form a hollow tube of predetermined diameter when unrestrained, means defining spaced apart alternately arranged long and short tongue portions along each edge of said strip, said tongue portions along one edge of said strip being staggered with respect to tongue portions along the other edge of said strip so that said relatively long tongue portions on one edge of said strip are positioned opposite relatively short tongue portions on the opposite edge of said strip, means for storing said strip in the form of a flat tape, means for removing said strip from said storage means and permitting the strip to form a hollow tube, said last named means including means operative as said strip forms said hollow tube for moving said relatively long tongue portions inwardly so that they are positioned beneath the adjacent relatively short tongue portions of the opposite edge of said strip when said hollow tube is formed.

4. An extensible tube apparatus as set forth in claim 3, wherein each of said relatively long tongue portions is provided with a pair of steeply sloped edges which are held in wedging engagement with the steeply sloped edges of the opposite relatively long tongues by the tendency of said strip to form a diameter smaller than that which is permitted by engagement of said steeply sloped edges, whereby the extended tube is able to resist rotational and bending forces exerted thereon.

5. An extensible tube apparatus comprising a thin metallic strip prestressed to form a hollow tube of predetermined diameter when unrestrained, a storage reel on which said strip is initially stored in flat form, a drive wheel spaced from said storage reel and adapted to remove said strip from said storage reel, means positioned beyond said drive wheel for guiding said strip so that it forms a hollow tube of a diameter larger than said predetermined diameter, means including gear means for driving said drive wheel in timed relation with said storage reel, and a spring connected between said gear means and said storage reel and having a substantially constant torque characteristic so that substantially constant tension is maintained in said strip between said drive wheel and said storage reel as said strip is removed from said storage reel.

6. An extensible tube apparatus as set forth in claim 5 wherein said spring is a spiral power spring which provides substantially constant torque with rotation as said strip is removed from said storage reel.

References Cited

UNITED STATES PATENTS

| | | | |
|---|---|---|---|
| 3,144,215 | 8/1964 | Klein | 242—54 |
| 3,357,457 | 12/1967 | Myer | 138—166 |

LEONARD D. CHRISTIAN, Primary Examiner

U.S. Cl. X.R.

52—108; 138—166